(12) United States Patent
Marsden et al.

(10) Patent No.: US 8,029,054 B2
(45) Date of Patent: Oct. 4, 2011

(54) ENERGY-DISSIPATION SYSTEM (75) Inventors: Andrew W Marsden, Hingham, MA (US); Ward Fritz, Chelsea, MA (US); Walter S Bezaniuk, Berkley, MA (US); Joe Langley, Foxboro, MA (US); David Amirault, Easton, MA (US)

(73) Assignee: Cosco Management, Inc., Wilmington, DE (US)

( * ) Notice: Subject to any disclaimer, the term of this patent is extended or adjusted under 35 U.S.C. 154(b) by 166 days.

(21) Appl. No.: 12/469,439

(22) Filed: May 20, 2009

(65) Prior Publication Data

US 2010/0295343 A1 Nov. 25, 2010

(51) Int. Cl.
*B60N 2/42* (2006.01)
(52) U.S. Cl. ............................. 297/216.11; 297/216.1
(58) Field of Classification Search ............ 297/216.1, 297/216.11; 280/739, 729, 728.1, 730.1; 180/271, 274
See application file for complete search history.

(56) References Cited

U.S. PATENT DOCUMENTS

| | | | | |
|---|---|---|---|---|
| 4,213,202 | A | * | 7/1980 | Larry ................................ 2/456 |
| 4,534,068 | A | * | 8/1985 | Mitchell et al. ................... 2/414 |
| 4,642,814 | A | * | 2/1987 | Godfrey ............................ 2/462 |
| 4,883,299 | A | * | 11/1989 | Bonar ........................... 293/110 |
| 4,899,961 | A | | 2/1990 | Herndon |
| 4,919,483 | A | | 4/1990 | Horkey |
| 5,235,715 | A | | 8/1993 | Donzis |
| 5,292,175 | A | | 3/1994 | Artz |
| 5,292,176 | A | | 3/1994 | Artz |
| 5,335,968 | A | | 8/1994 | Sheridan et al. |
| 5,567,015 | A | | 10/1996 | Arias |
| 5,881,395 | A | | 3/1999 | Donzis |
| 6,485,101 | B2 | | 11/2002 | Kassai et al. |
| 6,519,780 | B2 | | 2/2003 | Goodwin |
| 7,125,073 | B2 | | 10/2006 | Yoshida |
| 7,232,182 | B2 | | 6/2007 | Yoshida |
| 7,234,771 | B2 | | 6/2007 | Nakhla |
| 7,246,853 | B2 | | 7/2007 | Harcourt et al. |
| 7,293,828 | B2 | * | 11/2007 | Yoshida ................... 297/216.11 |
| 7,654,613 | B2 | | 2/2010 | Bass |
| 7,717,506 | B2 | | 5/2010 | Amesar et al. |
| 7,726,734 | B2 | | 6/2010 | Mahal et al. |
| 7,744,154 | B2 | | 6/2010 | Marsden et al. |
| 7,748,781 | B2 | | 7/2010 | Bass |
| 7,774,866 | B2 | * | 8/2010 | Ferrara ............................. 2/455 |
| 2001/0043001 | A1 | | 11/2001 | Kassai et al. |
| 2002/0153753 | A1 | | 10/2002 | Kassai |
| 2007/0085394 | A1 | | 4/2007 | Yang |

(Continued)

FOREIGN PATENT DOCUMENTS

EP 0928718 7/1999

(Continued)

OTHER PUBLICATIONS

International Search Report dated Feb. 13, 2009, for International Application No. PCT/US2008/087382.

(Continued)

*Primary Examiner* — Sarah B McPartlin
(74) *Attorney, Agent, or Firm* — Barnes & Thornburg LLP (57) ABSTRACT

A child restraint includes a juvenile vehicle seat and an energy-absorption apparatus coupled to the juvenile vehicle seat. The energy-absorption apparatus is configured to absorb external energy associated with an external impact force applied to the energy-absorption apparatus.

19 Claims, 4 Drawing Sheets

U.S. PATENT DOCUMENTS

| | | |
|---|---|---|
| 2007/0252418 A1 | 11/2007 | Harcourt et al. |
| 2008/0258518 A1 | 10/2008 | Santamaria |
| 2009/0066125 A1* | 3/2009 | Nett et al. ............ 297/216.11 |
| 2009/0152913 A1 | 6/2009 | Amesar et al. |
| 2009/0179469 A1 | 7/2009 | Bass |
| 2009/0179470 A1 | 7/2009 | Bass |
| 2009/0256404 A1 | 10/2009 | Strong et al. |
| 2010/0019554 A1 | 1/2010 | Mahal et al. |
| 2010/0026064 A1 | 2/2010 | Marsden et al. |
| 2010/0134470 A1 | 6/2010 | Bu et al. |
| 2010/0194158 A1* | 8/2010 | Mahal et al. ............ 297/216.11 |

FOREIGN PATENT DOCUMENTS

| | | |
|---|---|---|
| EP | 1167114 | 1/2002 |
| WO | 2009076514 | 6/2009 |

OTHER PUBLICATIONS

International Preliminary Report on Patentability (Ch. II) issued in connection with PCT/US2008/087382 and completed by the US Examining Authority on Oct. 9, 2010.

European Search Report dated Aug. 31, 2010, for related European Application No. EP 10163494.

* cited by examiner

ENERGY-DISSIPATION SYSTEM

BACKGROUND

The present disclosure relates to energy-absorbing apparatus, and in particular, to devices for dissipating energy associated with external impact forces. More particularly, the present disclosure relates to an energy-dissipation system included in a juvenile product such as a child-restraint system.

When exposed to an external impact force, a juvenile vehicle seat at rest on a seat in a car or truck will accelerate as it moves to a new location in the passenger compartment of a car or truck. A child seated in such a moving juvenile vehicle seat will also accelerate as the juvenile vehicle seat moves in the passenger compartment.

A g-load is a measurement of an object's acceleration measured in gs. The g is a non-SI unit equal to the nominal acceleration due to gravity on earth at sea level. A short-term acceleration experienced by a child seated in a juvenile vehicle seat (or any other juvenile seat) that moves suddenly is called a shock and is measured in gs.

SUMMARY

An energy-dissipation system in accordance with the present disclosure is included in an apparatus that is exposed to external impact forces. In an illustrative embodiment, the energy-dissipation system is coupled to a juvenile vehicle seat to provide a child-restraint system.

In illustrative embodiments, the energy-dissipation system includes a ride-down pad comprising a first force dissipator containing a volume of air that is discharged at a metered rate when the first force dissipator is exposed to an external impact force. The first force dissipator is thus configured to provide means for absorbing external energy applied to the first force dissipator to minimize g-loads experienced by a child seated in a juvenile vehicle seat exposed to an external impact force.

In illustrative embodiments, the first force dissipator includes an air bag for holding air or other fluid in an air chamber until deformation of the air bag following exposure to an external impact force. The first force dissipator also includes a deformable support frame located in the air chamber of the air bag. External energy is absorbed as air is discharged from the air chamber of the air bag and the deformable support frame is compressed after exposure to an external impact force.

In illustrative embodiments, each air bag is made of a deformable material formed to include one or more air-discharge ports. For example, an air bag can be made of a plastics material such as polyvinyl chloride or nylon.

In illustrative embodiments, the deformable support frame provides means for supporting a companion air bag to maintain at least a predetermined volume of air in the air chamber until the air bag is deformed when exposed to an external impact force so that the air bag does not deform too quickly and deforms at a rate that allows the first force dissipator to absorb external energy associated with the external impact force. In illustrative embodiments, the deformable support frame comprises several separate shock absorbers located in the air chamber of a companion air bag.

In illustrative embodiments, each shock absorber in the deformable support frame includes a deformable casing formed to include an interior chamber filled with a fluid medium such as air and maintained at a suitable pressure to allow deformation of the casing when exposed to an external impact force. When exposed to an external impact force, the casings in exposed shock absorbers are deformed to absorb external energy associated with these external impact forces.

In illustrative embodiments, the ride-down pad of the energy-dissipation further comprises a second force dissipator arranged to lie alongside the first force dissipator to form a stack of force dissipators. The first force dissipator is coupled to the juvenile vehicle seat and the second force dissipator is arranged to lie in spaced-apart relation to the juvenile vehicle seat to locate the first force dissipator therebetween. An illustrative second force dissipator includes several shock absorbers located in an air chamber formed in a second air bag. The first and second force dissipators cooperate to define a multi-stage ride-down pad.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a child-restraint system including a juvenile vehicle seat having a seat bottom and a seat back extending upwardly from the seat bottom and an energy-dissipation system coupled to the seat back and made in accordance with a first embodiment of the present disclosure, with portions broken away, and showing that the seat back comprises a backrest coupled to the seat bottom and a headrest coupled to the backrest and that the energy-dissipation system comprises a right-side ride-down pad mounted on an inner wall of a first side-wing panel included in the headrest and a left-side ride-down pad mounted on an inner wall of an opposite second side-wing panel included in the headrest and showing an external impact force about to strike an outer portion of the first side-wing panel carrying the right-side ride-down pad;

FIG. 3 is an exploded perspective assembly view of the left-side ride-down pad of FIGS. 1 and 2 showing that the ride-down pad comprises, in sequence, from right to left, an inner shell formed to include two cross-shaped, circumferentially spaced-apart, forwardly facing air-discharge ports, a first deformable support frame comprising several separate cylinder-shaped shock absorbers, a partition, a second deformable support frame comprising five separate cylinder-shaped shock absorbers, and an outer shell formed to include a two cross-shaped, circumferentially spaced-apart rearwardly facing air-discharge ports and suggesting that (1) the inner shell and the partition cooperate to form a first inner air bag having a first air chamber sized to receive the separate shock absorbers included in the first deformable support frame therein to form the first (inner) force dissipator, (2) the outer shell and the partition cooperate to form a second (outer) air bag having a second air chamber sized to receive the separate shock absorbers included in the second deformable support frame therein to form the second (outer) force dissipator, and (3) an optional deformable bag-shape retainer shield is configured to mount on the first side-wing panel to retain both of the first and second air bags in an undeformed shape until the right-side ride-down pad is deformed as suggested in FIGS. 6 and 7;

FIGS. 5-7 show a sequence in which the first and second force dissipators in the right-side ride-down pad are deformed following application of an external impact force to the first side-wing panel of the headrest to minimize the magnitude of a resulting force applied to a child seated in a juvenile vehicle seat carrying the right-side ride-down pad and thereby to minimize the g-load (acceleration) caused by the resulting force and experienced by the seated child;

DETAILED DESCRIPTION

Figures 1, 2:
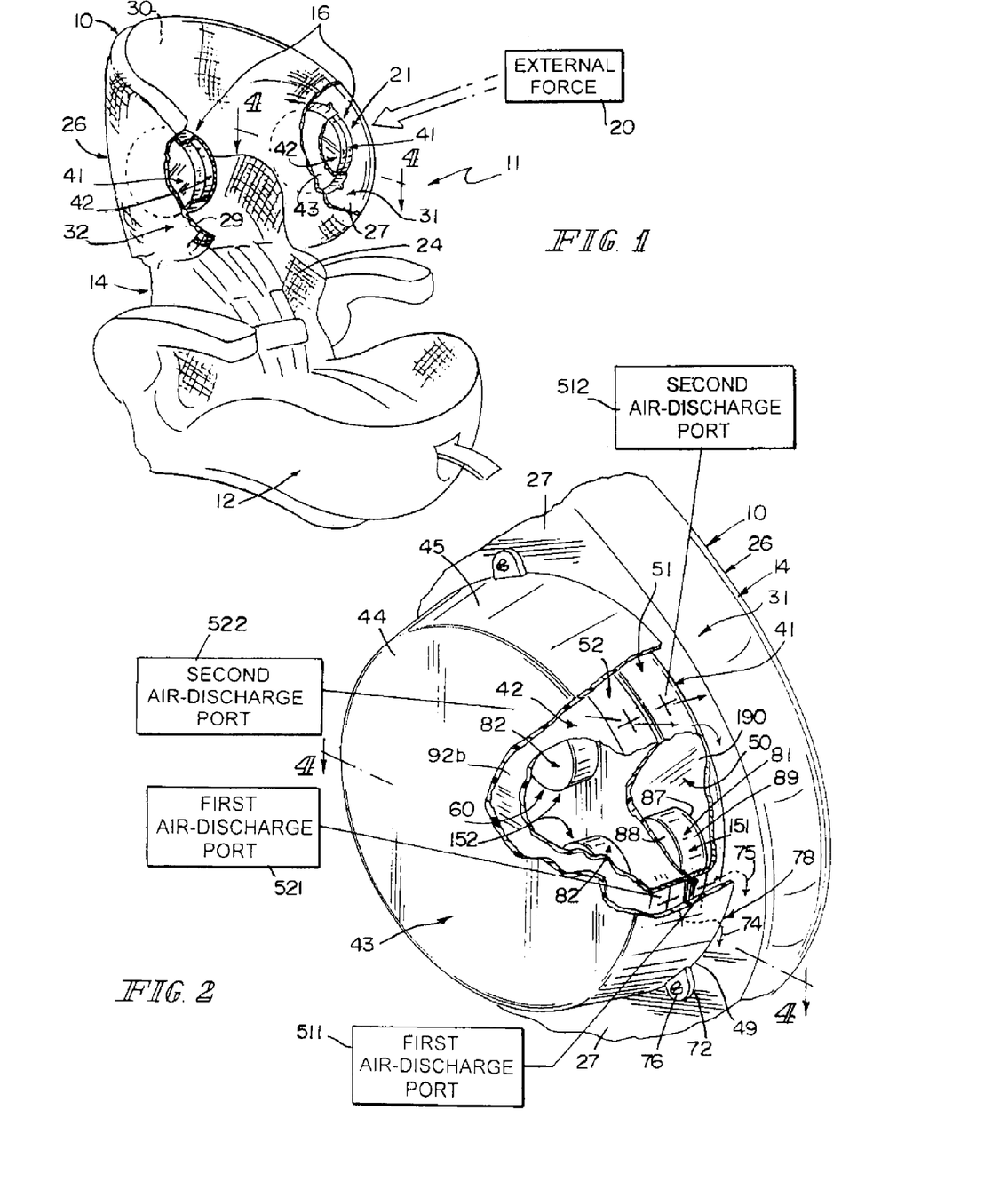
FIG. 2 is an enlarged perspective view of the right-side ride-down pad mounted on the first side-wing panel of the headrest shown in FIG. 1, with portions broken away to reveal some of the cylinder-shaped shock absorbers included in the right-side ride-down pad and showing (1) a first (inner) force dissipator coupled to the first side-wing panel and one of the shock absorbers included in the first (inner) force dissipator, (2) a second (outer) force dissipator coupled to the first (inner) force dissipator and two of the shock absorbers included in the second (outer) force dissipator, and (3) an optional bowl-shaped shield to the first side-wing panel and arranged to cover the stacked first and second force dissipators.

An illustrative child-restraint system 11 includes a juvenile vehicle seat 10 and an energy-dissipation system 16 coupled to juvenile vehicle seat 10 as suggested in FIG. 1. In illustrative embodiments, juvenile vehicle seat 10 includes a seat bottom 12 and a seat back 14 extending upwardly from seat bottom 12 and carrying energy-dissipation system 16.

Each energy-dissipation system 16 comprises a ride-down pad that is designed to minimize the g-loads experienced by a child seated on seat bottom 12 of juvenile vehicle seat 10 during exposure of seat 10 to an external impact force. Ride-down pads 21, 22 are shown, for example, in FIGS. 1, 2, and 5-7. Reference is hereby made to U.S. application Ser. No. 12/327,376 filed Dec. 4, 2008, the entirety of which is hereby incorporated by reference herein, for disclosures of various ride-down pad configurations and mounting arrangements.

As suggested in FIG. 1, seat back 12 of juvenile vehicle seat 10 includes a backrest 24 arranged to extend upwardly from seat bottom 12 and a headrest 26 coupled to backrest 24. Right-side ride-down pad 21 is coupled to an inner wall 27 of a first side-wing panel 31 included in headrest 26 as shown in FIGS. 1, 2, and 5-7. Left-side ride-down pad 22 is coupled to an inner wall 29 of a second side-wing panel 32 included in headrest 26 as shown in FIG. 1. A rear panel 30 is included in headrest 26 and arranged to interconnect first and second side-wing panels 31, 32 as suggested in FIG. 1.

During a collision or other incident, application of an external impact force 20 to right-side ride-down pad 21 causes energy to be transferred from an impacting object (not shown) to right-side ride-down pad 21 as suggested in FIGS. 1 and 5-7. Ride-down pad 21 absorbs that transferred energy as suggested in FIG. 7 to minimize the magnitude of a resulting force applied to a child 100 seated in juvenile vehicle seat 10 by a force transmitter 200 comprising outer cover 80, right-side ride-down pad 21, and first side-wing panel 31 (all included in juvenile vehicle seat 10) during the collision. Ride-down pad 21 functions to minimize the g-loads (acceleration) experienced by child 100 seated on seat bottom 12 of juvenile vehicle seat 10 during exposure of seat 10 to external impact force 20 as suggested in FIG. 7. Ride-down pad 21 also functions to maximize the time interval (i.e., ride-down time) between the moment the impacting object strikes ride-down pad 21 to apply the external impact force 20 and the moment that resulting force reaches zero. Ride-down pad 22 functions in a manner similar to ride-down pad 21.

Figure 3:
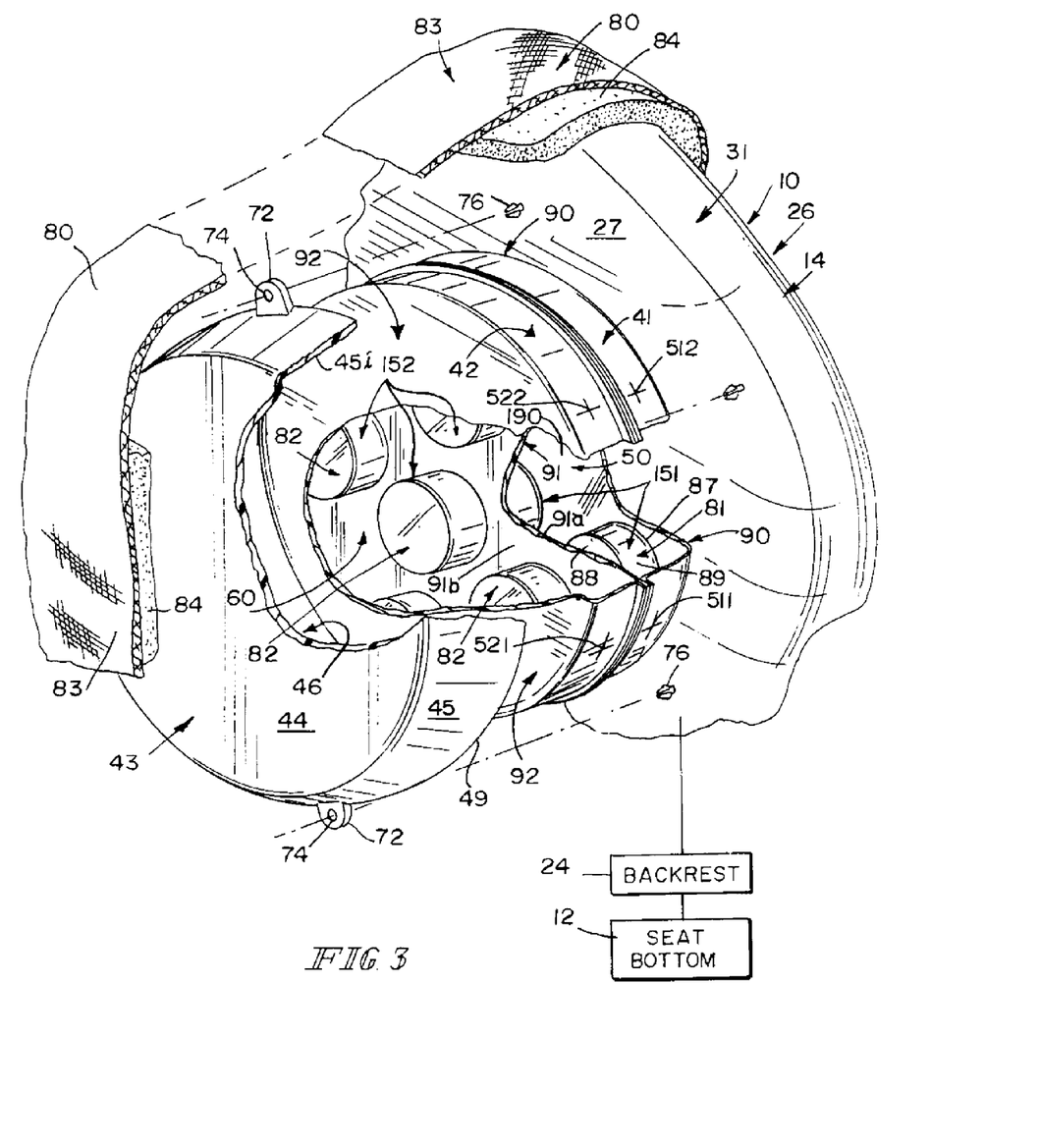

As suggested in FIGS. 2 and 3, right-side ride-down pad 21 is a multi-stage ride-down pad comprising a first (inner) force dissipator 41 and a second (outer) force dissipator 42. In an illustrative embodiment, each of first and second force dissipators 41, 42 comprises a vessel (such as a bag) containing a deformable support frame (such as a series of separate shock absorbers). First and second force dissipators 41, 42 are stacked in series so that first force dissipator 41 lies in an inner position between second force dissipator 42 and first side-wing panel 31 of headrest 26 and so that second force dissipator 42 lies in an outer position in spaced-apart relation to first side-wing panel 31. It is within the scope of this disclosure to configure right-side ride-down pad 21 as a single-stage ride-down pad comprising only first force dissipator 41 or second force dissipator 42.

First (inner) force dissipator 41 includes a first bag 51 and a first deformable support frame 151 as suggested in FIGS. 2 and 3. First bag 51 is formed to include a first air chamber 50 and separate first and second air-discharge ports 511, 512 opening into first air chamber 50. First deformable support frame 151 includes several separate shock absorbers 81 located in first air chamber 50 as suggested in FIGS. 2 and 3.

First bag 51 can be formed using any suitable method using any suitable material. In an illustrative embodiment, as suggested in FIG. 3, first bag 51 comprises an inner shell 90 formed to include separate first and second air-discharge ports 511, 512 and a portion 91a of partition 91 coupled to inner shell 90 to form first air chamber 50 therebetween. Although each air-discharge port 511, 512 is a cross-shaped pair of intersecting slits as suggested in FIGS. 2 and 3, it is within the scope of this disclosure to provide air-discharge ports defined by a slit or an aperture or another suitable opening.

Figure 4:
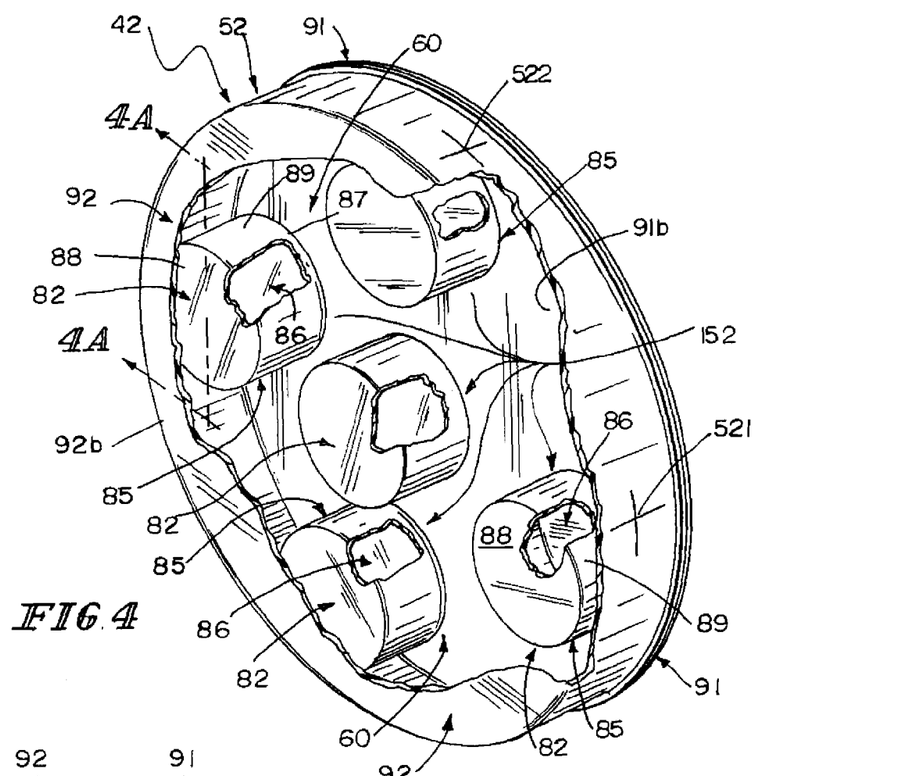
FIG. 4 is an enlarged sectional view taken along line 4-4 of FIGS. 1 and 2 (following removal of the optional deformable bag-shape retainer shield) of the second (outer) force dissipator, with portions of the partition and outer shell broken away to reveal a deformable support frame comprising five separate shock absorbers positioned to lie in spaced-apart relation to one another in the air chamber formed in the second (outer) air bag between the outer shell and the partition.

Second (outer) force dissipator 42 includes a second bag 52 and a second deformable support frame 152 as suggested in FIGS. 2-4. Second bag 52 is formed to include a second air chamber 60 and first and second air discharge ports 521, 522 opening into second air chamber 60. Deformable support frame 152 includes several separate shock absorbers 82 located in second air chamber 60 as suggested in FIGS. 2-4.

Second bag 52 can be formed using any suitable method using any suitable material. In an illustrative embodiment, as suggested in FIGS. 3 and 4, second bag 52 comprises an outer shell 92 formed to include first and second air-discharge ports 521, 522 and a portion 91b of partition 91 coupled to outer shell 92 to form second air chamber 60 therebetween. Although each air-discharge port 521, 522 is a cross-shaped pair of intersecting slits 521, 522 as suggested in FIGS. 2 and 3, it is within the scope of this disclosure to provide a second air-discharge port defined by a slit or an aperture or another suitable opening.

Shock absorbers 81, 82 are illustrative examples of deformable support frames that are located in air chambers formed in bags 51, 52 or other vessels in accordance with the present disclosure. A deformable support frame as disclosed herein provides means for supporting the vessel (e.g., bag) to maintain at least a predetermined volume of air (or other fluid) in the air chamber until the vessel is deformed when exposed to an external impact force. The vessel is thus supported by the deformable support frame so that the vessel does not deform too quickly and deforms at a rate that allows the vessel to absorb external energy associated with the external impact force.

Figure 4A:
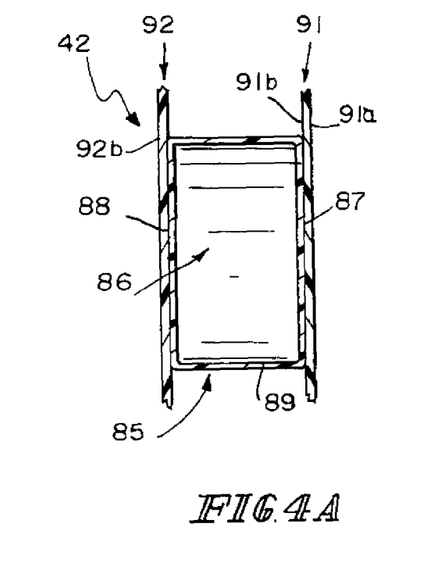
FIG. 4A is an enlarged sectional view taken along line 4A-4A of one of the shock absorbers shown in FIG. 4 in an undeformed inflated state and showing that the shock absorber comprises a normally cylinder-shaped casing including a round bottom wall touching the partition, a round top wall touching a base wall included in the outer shell, and a cylindrical band interconnecting and cooperating with the round top and bottom walls to form an interior chamber and a fluid medium such as air in the interior chamber.
Figure 4B:
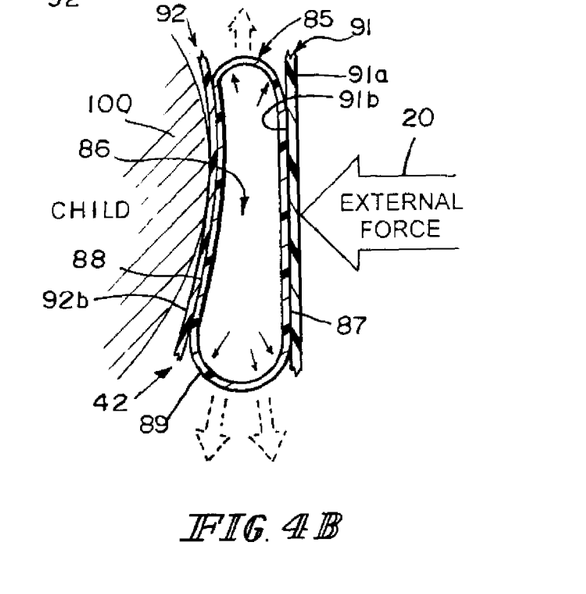
FIG. 4B is a sectional view similar to FIG. 4A showing deformation of the shock absorber of FIG. 4A in response to application of an external impact force (as suggested in FIG. 1) to the first side-wing panel of the headrest to cause the outer shell and the partition (cooperating to form the second (outer) air bag) to be deformed and moved toward one another when compressed between the external impact force and a child seated in the juvenile vehicle seat to squeeze one or more of the shock absorbers located in the air chamber provided therebetween.

Illustrative shock absorbers 82 are arranged to lie in spaced-apart relation to one another in air chamber 60 to define deformable support frame 152 as shown, for example, in FIG. 4. Each illustrative shock absorber 82 includes a normally cylinder-shaped casing 85 formed to include an interior chamber 86 containing a fluid medium such as air therein as suggested in FIGS. 4, 4A, and 4B. An illustrative casing 85 includes a round bottom wall 87 touching inner surface 91b of partition 91, a round top wall 88 touching a base wall 92b included in outer shell 92, and a cylindrical band 89 interconnecting and cooperating with top and bottom walls 87, 88 to form interior chamber 86 as shown, for example, in FIGS. 4, 4A, and 4B.

Figure 5:
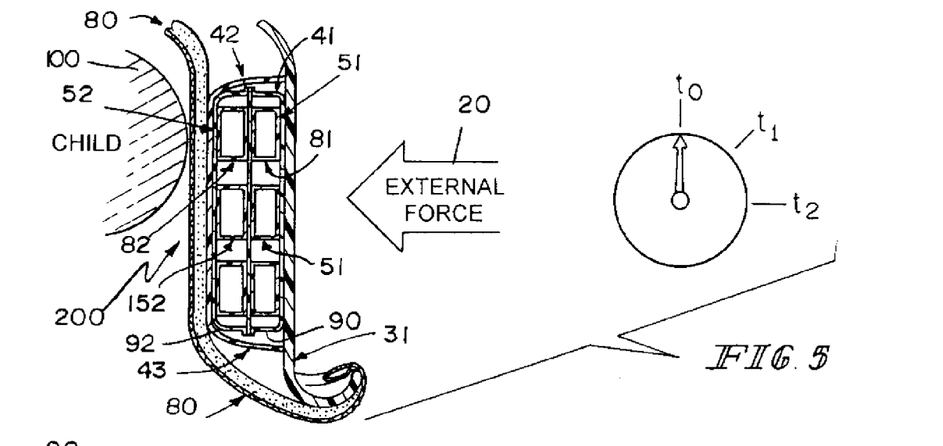
FIG. 5 shows a diagrammatic representation of a child at a time $t_0$ before an external impact force is applied to the first side-wing panel of the headrest.
Figure 6:
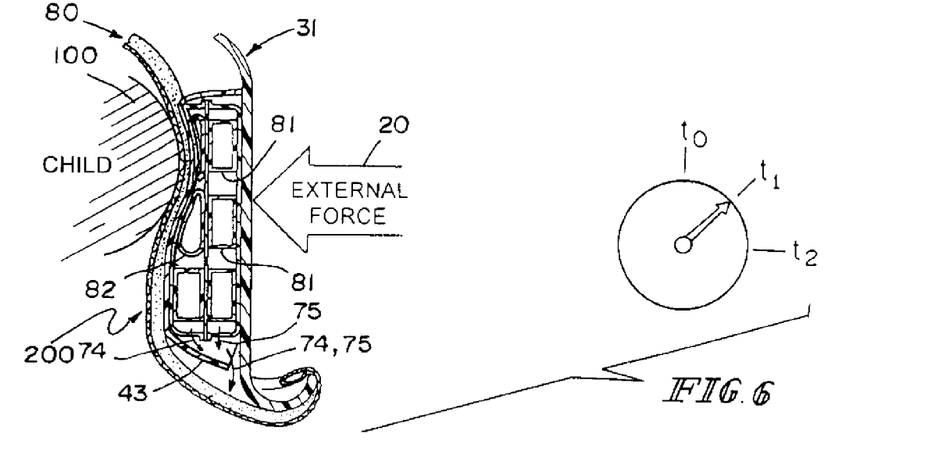
FIG. 6 is a diagrammatic view similar to FIG. 5 at a later time $t_1$ after the external impact force has deformed a portion of the shield and the second (outer) force dissipator and showing partial deformation of the outer shell and some of the cylinder-shaped shock absorbers included in the second deformable support frame located in an air chamber formed in a second (outer) air bag.
Figure 7:
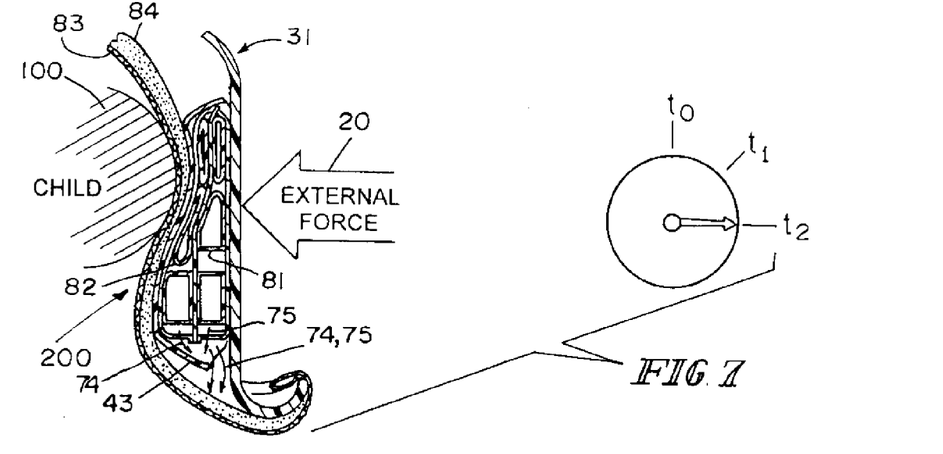
FIG. 7 is a diagrammatic view similar to FIGS. 5 and 6 at a still later time $t_2$ after the external impact force has also deformed a portion of the first (inner) force dissipator and showing partial deformation of the partition and some of the cylinder-shaped shock absorbers included in the first deformable support frame located in an air chamber formed in a first (inner) air bag.

Absorption of external energy associated with external impact force 20 by first and second force dissipators 41, 42 of right-side ride-down pad 21 is shown illustratively and diagrammatically in a sequence shown in FIGS. 5-7. Left-side ride-down pad 22 absorbs external energy in a similar manner when an external impact force strikes a second side-wing panel 32 carrying left-side ride-down pad 22. It is within the scope of the present disclosure to mount one of ride-down pads 21, 22 in an impact strike zone on a juvenile seat or other device. It is within the scope of the present disclosure to mount a ride-down pad on an exterior or interior wall (or both an interior and exterior wall) of the seat or device.

As suggested diagrammatically in FIG. 5, each of force dissipators 41, 42 included in right-side ride-down pad 21 is substantially undeformed at time $t_0$ before any collision involving juvenile vehicle seat 10 takes place. Shield 43 is used in the illustrative embodiment to minimize deformation of first and second force dissipators 41, 42 as a result of incidental contact. It is within the scope of this disclosure to omit shield 43 and use only a ride-down pad comprising one or more force dissipators.

As suggested diagrammatically in FIG. 6, during a collision, external impact force 20 strikes first side-wing panel 31 of headrest 26 to deform a portion of second (outer) force dissipator 42, for example, at least second bag 52 and some of shock absorbers 82 included in deformable support frame 152 and located in second air chamber 60 formed in second bag 52. During such deformation, at later time $t_1$, some of the air extant in second air chamber 60 is discharged through air-discharge ports 521, 522 as discharged air 74 to the atmosphere surrounding second bag 52 of second (outer) force dissipator 42. At time $t_1$, some of the transferred energy associated with external impact force 20 has been dissipated owing, in part, to deformation of second bag 52 and shock absorbers 82 and discharge of air from second air chamber 60 through air-discharge ports 521, 522.

As suggested diagrammatically in FIG. 7, external impact force 20 also acts to deform a portion of first (inner) force dissipator 41, for example, first bag 51 and some of shock absorbers 81 included in deformable support frame 151 of first (inner) force dissipator 41. Some of the air extant in first air chamber 50 is exhausted through air-discharge ports 511, 512 as discharged air 75 to the atmosphere surrounding first bag 51 of first (inner) force dissipator 51 as suggested in FIG. 7.

At later time $t_2$, as suggested in FIG. 7, juvenile vehicle seat 10 has moved relative to child 100 to cause a portion (e.g., the head) of child 100 to contact and deform right-side ride-down pad 21. First (inner) and second (outer) force dissipators 41, 42 of right-side ride-down pad 21 cooperate to absorb energy transferred by external impact force 20 to minimize a resulting force applied to child 100 seated in juvenile vehicle seat 10. This energy absorption feature minimizes the g-loads (acceleration) experienced by child 100 and also maximizes the ride-down time between the first strike of an impacting object on first side-wing panel 31 of headrest 26 of juvenile vehicle seat 10 and the moment that the resulting force reaches zero.

In an illustrative embodiment, an outer cover 80 is coupled to headrest 26 and arranged to cover each of right-side and left-side ride-down pads 21, 22. Outer cover 80 functions to dissipate energy associated with external impact forces 20 and to protect ride-down pads 21, 22 from damage. In an illustrative embodiment, outer cover 80 includes an outer skin 83 and a cushion 84 under outer skin 83 as shown, for example, in FIGS. 3-5.

An optional deformable bag-shape retainer shield 43 may be used to provide a protective cover for first and second bags 41, 42 as suggested in FIGS. 1-3 and 5. Deformable bag-shape retainer shield 43 is configured to provide means for retaining each of first and second bags 41, 42 in its undeformed shape until a sufficient external impact force 20 is applied to juvenile vehicle seat 10 to cause deformation of deformable bag-shape retainer shield 43 as suggested in FIG. 5 so that premature deformation of first and second bags 41, 42 is avoided. Left-side ride-down pad 22 is similar in construction to right-side ride-down pad 21.

In the illustrated embodiment, an inner shell 90, and outer shell 92, and a partition 91 located between inner and outer shells 90, 92 and arranged to cooperate with inner and outer shells 90, 92 to form first and second bags 41, 42 as suggested in FIG. 4. An inner surface 91a of partition 91 mates with inner shell 90 to form first air chamber 50 therebetween and to define first bag 41. An outer surface 91b of partition 91 mates with outer shell 92 to form second air chamber 60 therebetween and to define second bag 42. Entirely separate first and second bags could also be used and fall within the scope of the present disclosure. Each of air-discharge ports 511, 512, 521, 522 are arranged to face (i.e., open) toward an interior wall 45*i* of side wall 45 of deformable bag-shape retainer shield 43 as suggested for example, in FIGS. 2, 4, and 5.

As suggested in FIG. 5, each of first and second air-discharge ports 511, 512 provided in first bag 41 are formed to include means for discharging air 75 from first air chamber 50 to the surroundings outside first bag 41 at a metered rate when first bag 41 is exposed to external impact force 20 after deformation of deformable bag-shape retainer shield 43. Similarly, each of first and second air-discharge ports 521, 522 provided in second bag 42 are formed to include means for discharging air 74 from second air chamber 60 to the surroundings outside second bag 42 at a metered rate when second bag 42 is exposed to external impact force 20 after deformation of deformable bag-shape retainer shield 43. As a result, after shield 43 is deformed, each of first and second bags 41, 42 will be exposed to an external impact force to change from the undeformed shape to a deformed shape so that first and second force dissipators 41, 42 of right-side ride down pad 21 absorb external energy associated with external impact force 20 to minimize g-loads experienced by child 100 seated in juvenile vehicle seat 10. It is within the scope of the present disclosure to omit shield 43.

Deformable bag-shape retainer shield 43 includes a top wall 44 and a side wall 45 coupled to top wall 44 to form an interior region containing first and second bags 41, 42 as suggested in FIGS. 2-5. Shield 43 is bowl-shaped in an illustrative embodiment and is coupled to inner wall 27 of first side-wing panel 31 of headrest 26 to form a bag-receiving space therebetween, which space is substantially coextensive with an interior region of shield 43 as shown, for example, in FIG. 2. Shield 43 is made of a deformable but somewhat rigid (e.g., plastics) material to assume a predetermined shape to shield first and second bags 41, 42 from incidental contact so that first and second bags 41, 42 remain in their undeformed shapes until shield 43 is deformed as suggested in FIG. 6 and first and second bags 41, 4 are exposed to an external impact force and deflated partly or fully.

In an illustrative embodiment, top wall 44 of shield 43 is round and side wall 45 is an endless strip having a frustoconical shape as suggested in FIGS. 2 and 3. Side wall 45 is arranged to surround a perimeter edge of each of first and second bags 41, 42 as suggested in FIG. 2. Top wall 44 is coupled to side wall 45 to lie in spaced-apart relation to a portion of inner wall 27 of first side-wing panel 31 to locate bag-receiving space therebetween. Side wall 45 has an annular bottom edge 49 arranged normally to mate with inner wall 27 as suggested in FIG. 2. Top wall 44 is made of a plastics material and arranged to cooperate with side wall 45 (also made of the same plastics material) to form a monolithic element as suggested in FIG. 2.

Child restraint 11 also includes anchor means 70 for coupling side wall 45 of deformable bag-shape retainer shield 43 to inner wall 27 of first side-wing panel 31 of headrest 26 as suggested in FIGS. 2 and 3. Anchor means 70 includes a mount tab 72 coupled to side wall 45 and formed to include a fastener-receiver aperture 74 and an upstanding fastener 76 coupled to inner wall 27. Fastener 76 is arranged to extend through fastener-receiver aperture 74 as suggested in FIGS. 2 and 3 to couple side wall 45 to inner wall 27. In an illustrative embodiment, there is not a sealed connection between side wall 45 and inner wall 27 and side wall 45 may deform somewhat or otherwise provide a vent space between side wall 45 and inner wall 27 to allow discharge of air 74, 75 as suggested, for example, in FIGS. 2 and 5. In the illustrated embodiment, several companion pairs of mount tabs 72 and fasteners 76 are provided around the periphery of side wall 45.

As suggested in FIG. 1, child restraint 11 includes a juvenile vehicle seat 10 and an energy-dissipation system 16 coupled to juvenile vehicle seat 10. Energy-dissipation system 16 in an illustrative embodiment comprises at least a first force dissipator 41 including a first bag 51 and a deformable first support frame 151 as suggested in FIGS. 2 and 3. First bag 51 is formed to include a first air chamber 50 and a first air-discharge port 511 opening into first air chamber 50. First support frame 151 is located in first air chamber 50 and made of a deformable material. First support frame 151 is configured to support first bag 51 to maintain at least a predetermined volume of air in first air chamber 50 until first bag 51 and first support frame 151 are deformed when exposed to an external impact force 20 as suggested in FIGS. 5-7. First support frame 151 includes a first shock absorber 81 located in first air chamber 50. As suggested in FIGS. 2 and 3, first shock absorber 81 is arranged to lie in spaced-apart relation to first air-discharge port 511 and between and in confronting relation to two opposing walls 91, 190 included in first bag 51 and arranged to locate first air chamber 50 therebetween. First air-discharge port 511 formed in first bag 51 is configured to provide means for discharging air from first air chamber 50 to the surroundings at a metered rate when first bag 51 is exposed to external impact force 20 so that first force dissipator 41 absorbs external energy associated with external impact force 26 to minimize g-loads experienced by a child seated in juvenile vehicle seat 10.

First shock absorber 81 includes a thin-walled deformable casing 85 formed to include an interior chamber 86 filled with a fluid medium such as air. The fluid medium (e.g., air) is maintained at a predetermined pressure to allow deformation of deformable casing 85 in response to application of a force to deformable casing 85 owing to relative movement of two opposing walls 91, 190 included in first bag 51. Deformable casing 85 is continuous and imperforate to establish a closed volume defining interior chamber 86 in an illustrative embodiment to contain the fluid medium therein during deformation of deformable casing 85.

Deformable casing 85 includes a top wall 88 contacting a first 91 of the two opposing walls 91, 190 included in first bag 51, a bottom wall 87 contacting a second 190 of the two opposing walls 91, 190 included in first bag 51, and a band 89 interconnecting and cooperating with the top and bottom walls 88, 87 to form interior chamber 86. Each of top and bottom walls 88, 87 is round and band 89 is cylindrical. The two opposing walls 91, 190 are mated at perimeter edges thereof to form first air chamber 50 therebetween.

An array of separate auxiliary shock absorbers 81 is located in the first air chamber 50 in a manner similar to the array of auxiliary shock absorbers 82 shown in FIG. 4. The separate auxiliary shock absorbers 81 are arranged to lie in spaced-apart relation to first shock absorber 81 and to one another. First shock absorber 81 and the separate auxiliary shock absorbers 81 cooperate to maintain the two opposing walls 91, 190 included in first bag 51 in separated relation from one another until first bag 51 is exposed to the external impact force 20 in a manner similar to that shown for shock absorbers 82 in second bag 52 in FIGS. 4, 4A, and 4B.

Energy-dissipation system 16 further comprises a second force dissipator 42 formed to include a second air chamber 60. Second force dissipator 42 is arranged to lie in spaced-apart relation to juvenile vehicles seat 10 as suggested in FIGS. 1, 2, and 5 to locate first force dissipator 41 between second force dissipator 42 and juvenile vehicle seat 10. Second force dissipator 42 cooperates with first force dissipator 41 to define means for absorbing external energy applied to second force dissipator 42 and transferred to juvenile vehicle seat 10 via first force dissipator 41 as suggested in FIGS. 5-7 to minimize g-loads experienced by a child seated in juvenile vehicle seat 110.

Second force dissipator 42 includes a second bag 52 and a second support frame 152. Second bag 52 is formed to include second air chamber 60 and a second air-discharge port 521 opening into second air chamber 60. Second support frame 152 is located in second air chamber 60 and made of a deformable material and configured to support second bag 52 to maintain at least a predetermined volume of air in second air chamber 60 until second bag 52 and second support frame 152 are deformed when exposed to an external impact force 20 as suggested in FIGS. 5-7. Second air-discharge port 521 is configured to provide means for discharging air from second air chamber 60 to the e surroundings at a metered rate when second bag 52 is exposed to the external impact force 20 so that second force dissipator 42 absorbs external energy associated with external impact force 20 to minimize g-loads experienced by a child seated in juvenile vehicle seat 10.

First bag 51 includes a first shell 90 and a first surface 91 a of a partition 91 located in spaced-apart relation to juvenile vehicle seat 10. Partition 91 is mated with first shell 90 to form the first air chamber therebetween as suggested in FIGS. 2 and 3.

First support frame 151 includes at least two separate shock absorbers 81 located in first air chamber 50 and arranged to mate with first surface 91a of partition 91 and first shell 90. Second bag 52 includes a second shell 92 and an opposite second surface 91b of partition 91 mated with second shell 92 to form second air chamber 60 therebetween as suggested in FIGS. 2-4. Second support frame 152 includes at least two separate shock absorbers 82 located in second air chamber 60 and arranged to mate with second surface 91b of partition 91 and second shell 92.

The fluid medium (e.g., air) is maintained at a predetermined pressure in interior chamber 86 of each first shock absorber 81 to allow deformation of deformable casing 85 of each first shock absorber 81 in response to relative movement of first shell 90 and partition 91 as suggested in FIGS. 5-7. The fluid medium is maintained at a predetermined pressure in interior chamber 86 of each second shock absorber 82 to allow deformation of each second shock absorber 82 in response to relative movement of second shell 92 and partition 91 as suggested in FIGS. 4A, 4B, and 5-7.

Energy-dissipation system 16 includes an inner shell 90, an outer shell 92, and a partition 91. Partition 91 is located between the inner and outer shells 90 and coupled to each of inner and outer shells 90, 82.

Inner shell 90 cooperates with an inner surface 91 a of partition 91 to form a first air chamber 50 therebetween and establish a first bag 51. First bag 51 is formed to include a first air-discharge port opening 511 into first air chamber 50.

Outer shell 92 cooperates with an outer surface 91b of partition 91 to form a second air chamber 60 therebetween and establish a second bag 52. Second bag 52 is formed to include a second air-discharge port 521 opening into second air chamber 60.

Energy-dissipation system 16 further includes more than one first shock absorber 81 located in first air chamber 50 and configured to provide first bag-support means for supporting first bag 51 to maintain at least a predetermined volume of air in first air chamber 50 until first bag 51 and first shock absorbers 81 are deformed when exposed to an external impact force 20 applied to juvenile vehicle eat 10 to cause first bag 51 and first shock absorbers 81 to cooperate to form a first force dissipator 41 configured to absorb external energy associated with external impact force 20 to minimize g-loads experienced by a child seated in juvenile vehicle seat 10. Energy-dissipation system 16 further includes more than one second shock absorber 82 located in second air chamber 60 and configured to provide second bag-support means for supporting second bag 52 to maintain at least a predetermined volume of air in second air chamber 60 until second bag 52 and second shock absorbers 82 are deformed when exposed to the external impact force to cause second bag 52 and second shock absorbers 82 to cooperate to form a second force dissipator 42 configured to absorb external energy associated with external impact force 20 to minimize g-loads experienced by a child seated in juvenile vehicle seat 10.

The invention claimed is:

1. A child restraint comprising
a juvenile vehicle seat
an energy-dissipation system coupled to the juvenile vehicle seat, the energy-dissipation system comprising a first force dissipater including a first bag formed to include an undivided first air chamber and a first air-discharge port opening into the first air chamber and a first support frame located in the first air chamber and made of a deformable material and configured to support the first bag to maintain at least a predetermined volume of air in the first air chamber until the first bag and the first support frame are deformed when exposed to an external impact force, wherein the first air-discharge port is configured to provide means for discharging air from the first air chamber to the surroundings at a metered rate when the first bag is exposed to the external impact force so that the first force dissipater absorbs external energy associated with the external impact force to minimize g-loads experienced by a child seated in the juvenile vehicle seat, and wherein the first support frame includes a first shock absorber located in the first air chamber and arranged to lie in spaced-apart relation to the first air-discharge port and between and in confronting relation to two opposing walls included in the first bag and arranged to locate the first air chamber therebetween and wherein the first shock absorber includes a deformable casing formed to include an interior chamber filled with a fluid medium maintained at a predetermined pressure to allow deformation of the deformable casing in response to application of a force to the deformable casing owing to relative movement of the two opposing walls included in the first bag.

2. The child restraint of claim 1, wherein the deformable casing is continuous and imperforate to establish a closed volume defining the interior chamber to contain the fluid medium therein during deformation of the deformable casing.

3. The child restraint of claim 1, wherein the deformable casing includes a top wall contacting a first of the two opposing walls included in the first bag, a bottom wall contacting a second of the two opposing walls included in the first bag, and a band interconnecting and cooperating with the top and bottom walls to form the interior chamber.

4. The child restraint of claim 3, wherein each of the top and bottom walls is round and the band is cylindrical.

5. The child restraint of claim 1, wherein the first support frame further includes a second shock absorber located in the first air chamber and arranged to lie in spaced-apart relation to the first air-discharge port and to the first shock absorber and to lie between and in confronting relation to the two opposing walls included in the first bag.

6. The child restraint of claim 5, wherein each of the first and second shock absorbers includes a top wall contacting a first of the two opposing walls and a bottom wall contacting a second of the two opposing walls.

7. The child restraint of claim 6, wherein each of the first and second shock absorbers further includes a band interconnecting and cooperating with companion top and bottom walls to form an interior chamber.

8. The child restraint of claim 5, wherein the two opposing walls are mated at perimeter edges thereof to form the first air chamber therebetween.

9. The child restraint of claim 1, wherein an array of separate auxiliary shock absorbers is located in the first air chamber, the separate auxiliary shock absorbers are arranged to lie in spaced-apart relation to the first shock absorber and to one another, and the first shock absorber and the separate auxiliary shock absorbers cooperate to maintain the two opposing walls included in the first bag in separated relation from one another until the first bag is exposed to the external impact force.

10. A child restraint comprising
a juvenile vehicle seat and
an energy-dissipation system coupled to the juvenile vehicle seat, the energy-dissipation system comprising a first force dissipater including a first bag formed to include a first air chamber and a first air-discharge port opening into the first air chamber and a first support frame located in the first air chamber and made of a deformable material and configured to support the first bag to maintain at least a predetermined volume of air in the first air chamber until the first bag and the first support frame are deformed when exposed to an external impact force, wherein the first air-discharge port is configured to provide means for discharging air from the first air chamber to the surroundings at a metered rate when the first bag is exposed to the external impact force so that the first force dissipater absorbs external energy associated with the external impact force to minimize g-loads experienced by a child seated in the juvenile vehicle seat, and wherein the first support frame includes a first shock absorber located in the first air chamber and arranged to lie in spaced-apart relation to the first air-discharge port and between and in confronting relation to two opposing walls included in the first bag and arranged to locate the first air chamber therebetween and wherein the energy-dissipation system further comprises a second force dissipater formed to include a second air chamber and arranged to lie in spaced-apart relation to the juvenile vehicle seat to locate the first force dissipater between the second force dissipater and the juvenile vehicle seat and the second force dissipater cooperates with the first force dissipater to define means for absorbing external energy applied to the second force dissipater and transferred to the juvenile vehicle seat via the first force dissipater to minimize g-loads experienced by a child seated in the juvenile vehicle seat, the second force dissipater includes a second bag formed to include the second air chamber and a second air-discharge port opening into the second air chamber and a second support frame located in the second air chamber and made of a deformable material and configured to support the second bag to maintain at least a predetermined volume of air in the second air chamber until the second bag and the second support frame are deformed when exposed to an external impact force, the second air-discharge port is configured to provide means for discharging air from the second air chamber to the surroundings at a metered rate when the second bag is exposed to the external impact force so that the second force dissipater absorbs external energy associated with the external impact force to minimize g-loads experienced by a child seated in the juvenile vehicle seat, the first bag includes a first shell and a first surface of a partition located in spaced-apart relation to the juvenile vehicle seat and mated with the first shell to form the first air chamber therebetween, and the second bag includes a second shell and an opposite second surface of the partition mated with the second shell to form the second air chamber therebetween, and wherein the first support frame includes at least two separate shock absorbers located in the first air chamber and arranged to mate with the first surface of the partition and the first shell and the second support frame includes at least two separate shock absorbers located in the second air chamber and arranged to mate with the second surface of the partition and the second shell.

11. The child restraint of claim 10, wherein each of the first shock absorbers includes a deformable casing formed to include an interior chamber filled with a fluid medium maintained at a predetermined pressure to allow deformation of the deformable casing of each first shock absorber in response to relative movement of the first shell and the partition and each of the second shock absorbers includes a deformable casing formed to include an interior chamber filled with a fluid medium maintained at a predetermined pressure to allow deformation of each second shock absorber in response to relative movement of the second shell and the partition.

12. The child restraint of claim 11, wherein each deformable casing is continuous and imperforate to establish a closed volume defining the interior chamber therein to contain the fluid medium therein during deformable casing deformation.

13. The child restraint of claim 11, wherein each deformable casing includes a first wall contacting one of the first and second shells, a second wall contacting the partition, and a band interconnecting the first and second walls and cooperating with the first and second walls to define the interior chamber therebetween.

14. A child restraint comprising
a juvenile vehicle seat and
an energy-dissipation system coupled to the juvenile vehicle seat, wherein the energy-dissipation system includes an inner shell, an outer shell, and a partition located between the inner and outer shells and coupled to each of the inner and outer shells, the inner shell cooperates with an inner surface of the partition to form a first air chamber therebetween and establish a first bag, the first bag is formed to include a first air-discharge port opening into the first air chamber, the outer shell cooperates with an outer surface of the partition to form a second air chamber therebetween and establish a second bag, and the second bag is formed to include a second air-discharge port opening into the second air chamber, wherein the energy-dissipation system further includes more than one first shock absorber located in the first air chamber and configured to provide first bag-support means for supporting the first bag to maintain at least a predetermined volume of air in the first air chamber until the first bag and the first shock absorbers are deformed when exposed to an external impact force applied to the juvenile vehicle seat to cause the first bag and the first shock absorbers to cooperate to form a first force dissipater configured to absorb external energy associated with the external impact force to minimize g-loads experienced by a child seated in the juvenile vehicle seat and wherein the energy-dissipation system further includes more than one second shock absorber located in the second air chamber and configured to provide second bag-support means for supporting the second bag to maintain at least a predetermined volume of air in the second air chamber until the second bag and the second shock absorbers are deformed when exposed to the external impact force to cause the second bag and the second shock absorbers to cooperate to form a second force dissipater configured to absorb external energy associated with the external impact force to minimize g-loads experienced by a child seated in the juvenile vehicle seat.

15. The child restraint of claim 14, wherein each of the first shock absorbers includes a deformable casing formed to include an interior chamber filled with a fluid medium maintained at a predetermined pressure to allow deformation of the deformable casing of each first shock absorber in response to relative movement of the inner shell and the partition and each of the second shock absorbers includes a deformable casing formed to include an interior chamber filled with a fluid medium maintained at a predetermined pressure to allow deformation of each second shock absorber in response to relative movement of the outer shell and the partition.

16. The child restraint of claim 15, wherein each deformable casing is continuous and imperforate to establish a closed volume defining the interior chamber therein to contain the fluid medium therein during deformable casing deformation.

17. The child restraint of claim 15, wherein each deformable casing includes a first wall contacting one of the first and second shells, a second wall contacting the partition, and a band interconnecting the first and second walls and cooperating with the first and second walls to define the interior chamber therebetween.

18. A child restraint comprising
a juvenile vehicle seat
an energy-dissipation system coupled to the juvenile vehicle seat, wherein the energy-dissipation system includes a first bag formed to include an undivided first air chamber and a first air-discharge port opening into the first air chamber and more than one first shock absorber located in the first air chamber and configured to provide first bag-support means for supporting the first bag to maintain at least a predetermined volume of air in the first chamber until the first bag and at least one of the first shock absorbers are deformed when exposed to an external impact force applied to the juvenile vehicle seat to cause the first bag and the first shock absorbers to cooperate to form a first force dissipater coupled to the juvenile vehicle seat and configured to absorb energy associated with the external impact force to minimize g-loads experienced by a child seated in the juvenile vehicle seat and
wherein each of the first shock absorbers includes a deformable casing formed to include an interior chamber filled with a fluid medium maintained at a predetermined pressure to allow deformation of the deformable casing of each first shock absorber in response to relative movement of the first shell and the partition and each of the second shock absorbers includes a deformable casing formed to include an interior chamber filled with a fluid medium maintained at a predetermined pressure to allow deformation of each second shock absorber in response to relative movement of the second shell and the partition.

19. The child restraint of claim 18, wherein the energy-dissipation system further includes a second bag formed to include a second air chamber and a second air-discharge port opening into the second air chamber and more than one second shock absorber located in the second air chamber and configured to provide second bag-support means for supporting the second bag to maintain at least a predetermined volume of air in the second air chamber until the second bag and at least one of the second shock absorbers are deformed when exposed to an external impact force applied to the juvenile vehicle seat to cause the second bag and the second shock absorbers to cooperate to form a second force dissipater coupled to the juvenile vehicle seat and configured to absorb energy associated with the external impact force to minimize g-loads experienced by a child seated in the juvenile vehicle seat.

* * * * *